United States Patent [19]
Kobayashi et al.

[11] Patent Number: 5,044,768
[45] Date of Patent: Sep. 3, 1991

[54] THERMAL ENVIRONMENT SENSOR WITH MEANS TO ESTIMATE THE WIND VELOCITY

[75] Inventors: Masahiro Kobayashi; Noboru Kobayashi; Kazuhisa Shigemori, all of Sakai, Japan

[73] Assignee: Daikin Industries, Ltd., Osaka, Japan

[21] Appl. No.: 433,443

[22] Filed: Nov. 9, 1989

Related U.S. Application Data

[63] Continuation of Ser. No. 219,541, filed as PCT JP-87/00661 on Sep. 4, 1987, published as WO88/01728 on Mar. 10, 1988, abandoned.

[51] Int. Cl.$^5$ .......................... G01K 7/00; G01K 1/20
[52] U.S. Cl. .................... 374/109; 236/68 B; 128/736; 374/164
[58] Field of Search .............. 374/45, 109, 164; 73/189; 236/68 B; 128/736

[56] References Cited

U.S. PATENT DOCUMENTS

| | | | |
|---|---|---|---|
| 2,835,779 | 5/1958 | Kazan | 236/91 E |
| 3,062,941 | 11/1962 | White | 236/DIG. 14 |
| 3,246,838 | 4/1966 | Bauer | 236/36 |
| 4,058,254 | 11/1977 | Hallgreen | 374/109 |
| 4,125,012 | 11/1978 | Madsen | 374/45 |
| 4,164,869 | 8/1979 | Benzinger | 374/121 |
| 4,204,429 | 5/1980 | Shimazaki et al. | 374/164 |
| 4,391,913 | 7/1983 | Keldmann | 236/36 |
| 4,433,923 | 2/1984 | Rascati et al. | 374/109 |
| 4,504,157 | 3/1985 | Crabtree et al. | 374/109 |
| 4,531,844 | 7/1985 | Juras | 374/28 |
| 4,747,699 | 5/1988 | Kobayashi et al. | 374/109 |
| 4,854,730 | 8/1989 | Fraden | 374/164 |

FOREIGN PATENT DOCUMENTS

| | | | |
|---|---|---|---|
| 248537 | 10/1962 | Australia | 374/109 |
| 2145199 | 4/1972 | Fed. Rep. of Germany | 374/164 |
| 1330590 | 5/1963 | France | 374/164 |
| 139310 | 12/1979 | German Democratic Rep. | 374/109 |
| 53-107875 | 9/1978 | Japan . | |
| 56-128413 | 10/1981 | Japan . | |
| 58-218624 | 12/1983 | Japan . | |
| 60-170731 | 9/1985 | Japan . | |
| 61-181916 | 8/1986 | Japan . | |
| 0210666 | 9/1988 | Japan . | |

OTHER PUBLICATIONS

ASHRAE Standard, "Thermal Environmental Conditions for Human Occupancy" pp. 1–16, 1/29/81.
MacHattie/Kuehn, "Still Shade Temperature Meter for Use in Assessing Personnel Cold Stress" 7/80.

Primary Examiner—Thomas B. Will
Assistant Examiner—Diego F. F. Gutierrez
Attorney, Agent, or Firm—Wenderoth, Lind & Ponack

[57] ABSTRACT

A thermal environment sensor has a single temperature detector for detecting temperature and producing an output representative of the detected temperature, the temperature detector having, when heated by a predetermined constant power, a convective heat transfer coefficient giving it a wind velocity dependent temperature drop characteristic in close conformity with the wind velocity dependence of the effective temperature drop felt by a human body. A heater is provided for heating the temperature detector, and an electric power supply is connected to the heater for supplying the heater with a constant electric power corresponding to the predetermined constant power, and a temperature estimating circuit is connected to the temperature detector for correcting the output of the temperature detector by a predetermined constant temperature difference for thereby obtaining the effective temperature felt by a human body.

3 Claims, 6 Drawing Sheets

THERMAL ENVIRONMENT SENSOR WITH MEANS TO ESTIMATE THE WIND VELOCITY

This application is a continuation of now abandoned application, Ser. No. 07/219,541 filed as PCT JP87/00661 on Sep. 4, 1987, published as WO88/01728 on Mar. 10, 1988, now abandoned.

TECHNICAL FIELD

This invention relates to a thermal environment sensor used for controlling an air conditioner and more particularly to a sensor for detecting the effective temperature compensated for the wind velocity.

BACKGROUND ART

Figure 12:
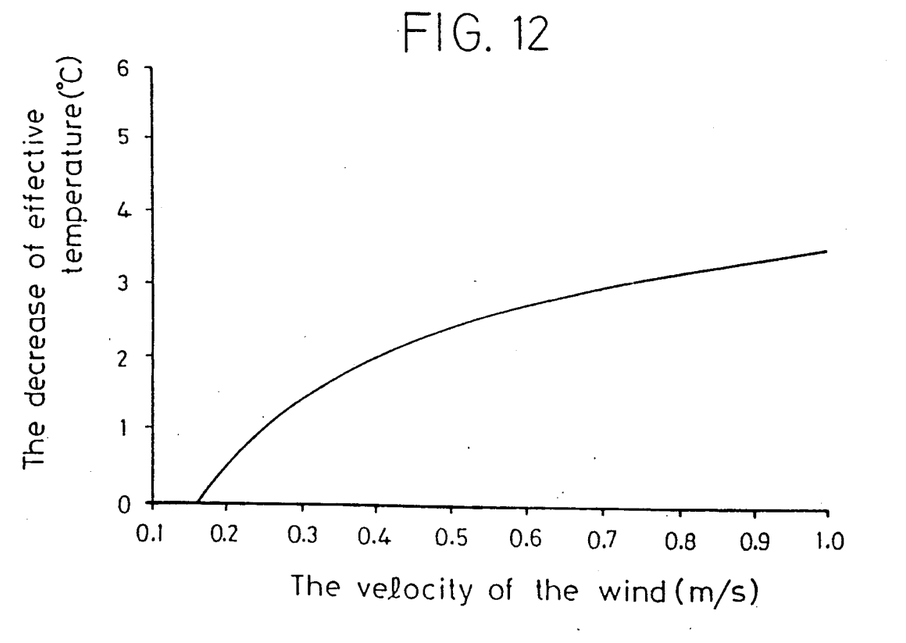
FIG. 12 is a graphical representation showing the effective temperature drop of the human body according to the wind velocity.

Conventionally, an air conditioner controls an air blowing temperature and the like based on only an air temperature measured by a thermistor or the like. However, it is well known that the effective temperature a human body feels is varied depending on the wind velocity. For example, FIG. 12 shows that the rate of decrease in the effective temperature increases with an increase in the wind velocity. Therefore, controlling of the air conditioner taking into consideration the influence of the wind velocity as well as the air temperature is desired.

For this purpose, there is a well-know technique to control the air conditioner taking into consideration the wind velocity by measuring not only the air temperature with a temperator detector but also the wind velocity with a thermal wind velocity sensor.

In this case, however, it is required to provide both a wind velocity sensor and a temperature detector, and in addition a circuit for estimating the wind velocity from heat loss, a temperature measuring instrument for compensating, a calculating circuit for calculating the effective temperature compensated for the wind velocity and the like are also required. As a result, the arrangement of the device is complicated.

Therefore, an object of this invention is to detect the effective temperature compensated for the wind velocity by a simple arrangement in a manner that the temperature of a heating element having the same wind velocity dependence of temperature drop as that of the effective temperature drop is detected not through the process of estimating the wind velocity from heat loss due to the wind as in the case using a thermal wind velocity sensor or the like, but by measuring the wind velocity directly.

DISCLOSURE OF THE INVENTION

To attain this object, in this invention there is provided a temperature detector and heating means for heating said temperature detector.

Moreover, an electric power supplying means is provided for supplying a constant electric power to the heating means predetermined by the convective heat transfer coefficient of said temperature detector so that the wind velocity dependence of the temperature drop of the temperature detector is closely conformed to that of the effective temperature drop felt by the human body due to wind velocity.

The arrangement is such as to detect the effective temperature Tv felt by the human body, which is the air temperature Ta compensated for the wind velocity Vb from the temperature Tg measured by the temperature detector.

To do this, a compensating constant temperature difference C calculated from formula (1) is established by previously measuring finally achieved temperature Tgb of the temperature at a standard wind velocity (for example 0.1 m/s) under the condition of an optional temperature of the surrounding air, namely the air temperature Ta.

$$C = Tgb - Ta \tag{1}$$

Since this compensating constant differential temperature C is not dependent on the air temperature Ta, and is almost constant for all wind velocities for a sensor heated with a certain power, the relationship between the effective temperature Tv felt by the human body at an air temperature and a temperature Tg of a sensor at a wind velocity in the environment is calculated according to formula (2).

$$Tv = Tg - C \tag{2}$$

In other words, the effective temperature Tv for a particular air temperature and wind velocity is estimated by subtracting constant temperature difference C, which is experimentally predetermined, from the temperature Tg of the temperature detector when heated by a certain electric power.

According to this arrangement, the effective temperature compensated for the wind velocity Vb is estimated by measuring the temperature of the temperature detector, since the wind velocity dependence of the temperature drop of the temperature detector is closely conformed to that of the effective temperature drop felt by the human body, when the temperature detector is heated with a certain electric power by the electric power supplying means. Therefore, the effective temperature for an air temperature Ta and a wind velocity Vb is estimated with a simple arrangement of a single temperature detector and simple circuits.

According to this invention, the effective temperature, taking into consideration the air temperature and the wind velocity, is estimated by a simple structure and comfortable air conditioning can be achieved by estimating the effective temperature compensated according to the wind velocity from a measured temperature of the temperature detector which is heated with the heating means for heating the temperature detector by supplying a certain electric power from the power supply means that is predetermined by a convective heat transfer coefficient of the temperature detector, wherein the wind velocity dependence of the temperature drop of the temperature detector is closely conformed to that of the effective temperature drop felt by the human body.

Concretely, for various controls of the air conditioner, for example, a control of a blow-off temperature, a blow-off direction, or a capacity control of compressor when a variable capacity type compressor is provided therein, precise control according to the effective temperature can be achieved.

BEST MODE FOR CARRYING OUT THE INVENTION

The best mode for carrying out this invention will now be explained in connection with an embodiment and with reference to the drawings.

Figure 1:
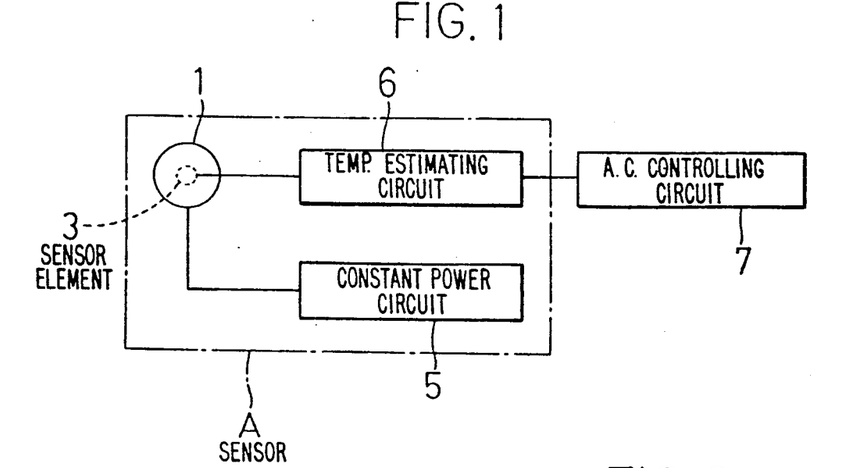
FIG. 1 is a block diagram schematically showing a circuit connected to a thermal environment sensor according to this invention.
Figure 2:
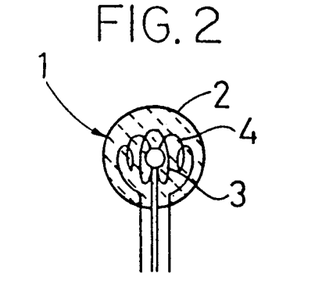
FIG. 2 is a schematic vertical section of a thermal environment sensor element used in the sensor of FIG. 1.

FIG. 1 shows a schematic arrangement of a thermal environment sensor A of this invention used for an air conditioner, wherein the sensor element 1 comprises a sphere-shaped electric insulation body 2 as shown in FIG. 2. A temperature detector 3 and a heater 4 constituting a heating means for heating the temperature detector 3 by a supply of electric power is disposed around the temperature detector 3, and the detector 3 and the heater 4 are enclosed with the sphere-shaped electric insulation body 2.

The heater 4 is connected with a constant-power circuit 5 adapted to serve as an electric power supplying means. The temperature detector 3 is to be heated by the heater 4 which is supplied with a predetermined electric power that is based on the convective heat transfer coefficient of the temperature detector 3 so that the wind velocity dependence of the temperature drop of the temperature detector 3 is closely conformed to that of the effective temperature drop felt by the human body.

Furthermore, an output signal from the temperature detector 3 is put into a temperature estimating circuit 6, and the output signal therefrom is put into a controlling circuit 7 of an air conditioner for controlling the operation of the air conditioner (not shown). The effective temperature Tv which is the value of the air temperature Ta compensated for the wind velocity Vb is estimated in the temperature estimating circuit 6 from detected temperature Tg of the temperature detector 3 when heated by the heater 4 with the predetermined electric power as adjusted by constant temperature difference C.

Therefore, in this embodiment, the constant electric power is supplied to the heater 4 by the constant-power circuit 5, and the temperature detector 3 is heated by the heater 4. The constant electric power supplied to the heater 4 from the constant-power circuit 5 is predetermined in accordance with the convective heat transfer coefficient of the temperature detector (3) so that the wind velocity dependence of the temperature drop of the temperature detector 3 is closely conformed to that of the effective temperature drop felt by the human body. For this reason, the effective temperature Tv compensated for the wind velocity Vb is estimated from the detected temperature Tg of the temperature detector 3 by the temperature estimating circuit 6. Therefore, the effective temperature for the air temperature Ta and compensated for the wind velocity Vb can be derived with a simple arrangement provided with the single temperature detector 3, the constant-power circuit 5 and the temperature estimating circuit 6.

Figure 3:
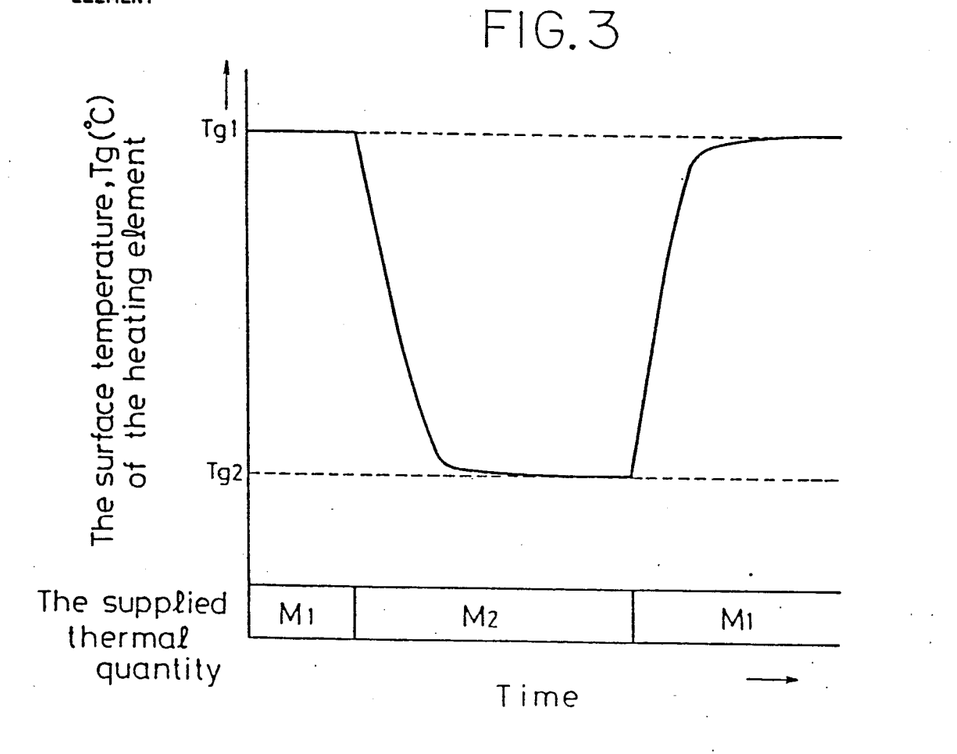
FIG. 3 is a graphical representation for explaining the process of detecting the absolute value of the wind velocity.

In this operation of the embodiment, an absolute value of the wind velocity cannot be estimated. However, as FIG. 3 shows, when the temperature detector 3 is intermittently heated by the heater 4, it is possible to estimate not only the effective temperature Tv but also the wind velocity Vb.

Namely, when the quantity of heat supplied to the temperature detector 3 is varied from $M_1$ to $M_2$, the convective heat transfer coefficient of the sensor element is hc, the temperature of the temperature detector 3 is changed from Tg1 to Tg2, the air temperature is Ta, and the absolute value of the wind velocity is V, the heat quantities $M_1$ and $M_2$ are represented by:

$$M_1 = hc\,(Tg1 - Ta) \qquad (3)$$

$$M_2 = hc\,(Tg2 - Ta) \qquad (4)$$

The expressions (3) and (4) can be combined to:

$$hc = (M_1 - M_2)/(Tg1 - Tg2) \qquad (5)$$

$$V = f(hc) \qquad (6)$$

Accordingly, when the relation of said expression (6) is experimentally predetermined, the embodiment can be operated at two heat quantities and the absolute value of the wind velocity V can be determined based on expressions (5) and (6).

Also, such a thermal environment sensor A can be combined with a humidity sensor or radiation sensor to control the air conditioner.

Figure 4:
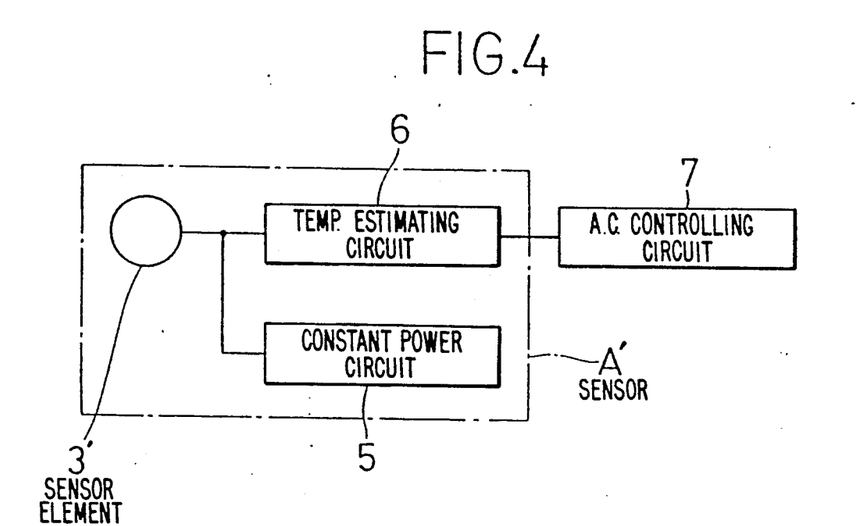
FIG. 4 is a block diagram similar to FIG. 1 of a second embodiment of a sensor.

In the above described embodiment, the temperature detector 3 is heated by the heater 4. However, in the embodiment of the sensor A', as shown in FIG. 4, in which the temperature detector 3' is adapted to be heated by using a self-heated element, a heater 4 for heating the detector 3 such as in the above described embodiment is not required and the equipment can be simplified, and it becomes possible to control the air conditioner effectively by remote control.

Figure 5:
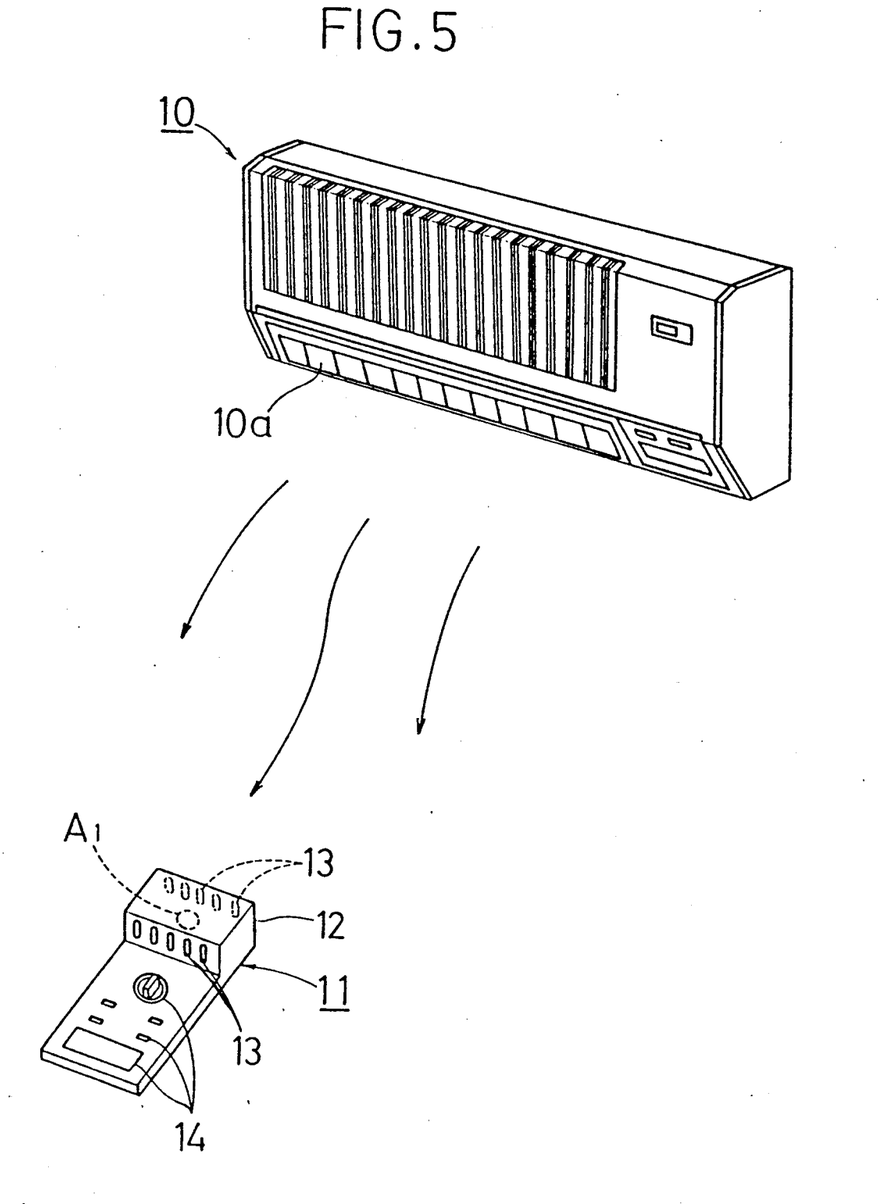
FIG. 5 is a perspective view of an air conditioner and a thermal environment sensor equipped with a remote controller for the air conditioner.

As shown in FIG. 5, for example, a thermal environment sensor A1 is provided in a casing 12 of a remote controller 11 for controlling the operation of the air conditioner 10, wherein the casing 12 of the remote controller 11 has open slits 13 for air flow. Various kinds of operating keys 14 for controlling may be provided so long as the remote controller 11 is arranged so that the thermal environment sensor A1 is touched by an air flow blown from an air blow-off port 10a of the air conditioner 10 through the slits 13.

In the above described self-heated temperature detector 3', there can be used a thermistor, a diode, a metallic resistor made of platinum and the like, or a transistor, FET, and so on.

Hereinafter, a specific arrangement is described for using a temperature detector 3' of the above described self-heated type.

There are two methods of using the self-heating type of detector.

(I) A method of estimating an equivalent effective temperature from the temperature of the detector (this changes in dependence on each condition of the air temperature, the radiation, the wind velocity and so on) when a constant electric power is supplied to the thermistor or the like (constant power method).

(II) A method of estimating the effective temperature from the quantity of electric power supplied to heat the detector to a certain temperature higher than the air temperature.

In the latter method (II), overshoot, hunching and so on may occur only with a conventional proportional control, and P1 control or P1D control is required, since the thermal time constant of the thermistor is supposed to be about $10^0$–$10^2$ seconds. Therefore, there is a problem that a design for the circuits and their adjustment become complicated. In the embodiment of the constant power method, there are three types of constant power methods, namely, (1) an approximately constant power method in which the detector is supplied with a constant voltage and a constant current, (2) a method of constant power control of a thermistor according to an analog or digital calculation, and (3) a constant power driving method in which the detector is supplied with a constant energy. Each type is explained below.

(1) The approximately constant power method in which the detector is supplied with a constant voltage and a constant current.

The electrical resistance property R of a thermistor is approximately according to formula (7).

$$R = T(T=T0) \cdot \exp[B(1/T - 1/T0)] \quad (7)$$

Since a constant value B is generally 3000–5000 (°/K.), a change of a resistance reaches 220%–380% with a temperature change from 20°–40°, and therefore, some calculation is required for supplying the constant electric power. On the other hand, when a temperature sensor having little property change due to the temperature change is used, it is possible to keep the fluctuation of power consumption small even with a constant current or a constant voltage supply.

If a diode is used as an element which is driven with about 0.6–0.7V and it has a temperature coefficient of about 2–3 mV/°C., although it is changed a little due to dispersion of a forward current, which dispersion is caused by production, and so on. Therefore, a fluctuation of the electric power stays within ±8–12% when a constant electric current is supplied in a temperature range of 20°–45°C.

There is an FET (field effect transistor) of the depletion mode type (normally ON) which operates with a constant voltage. For example, a certain voltage higher than a pinch-off voltage is applied to a constant current circuit with a J-FET. At that time, the temperature can be measured because the voltage from the constant current shows temperature dependence.

On the whole, this type of element has characteristics of 1) the circuit design is simple and cheap, 2) the cost of the temperature sensor is low, 3) but accurate constant power driving is difficult, and 4) there is no protection against the dispersion of the sensitivity of the element, a secular change, and so on. Especially, because of the dispersion of the sensitivity of the element, an inspection whether a compensation for correspondence of the property is required with one point or two points.

(2) The method of constant power control by an analog calculation.

This is a method of controlling a voltage (or an electric current) so as to keep the product of the current and the voltage constant, or a method of applying a voltage proportional to the reciprocal of the current (or a current proportional to the reciprocal of the voltage).

Generally, there are problems in the cost, the power source voltage, the electric power consumed, etc. since a method of using a logarithmic or a reciprocal logarithmic amplification or a variable mutual conductance method is mostly used in an analog multiplier or divider. There are also problems that a pair of transistors the property of which corresponds is required, etc. when the device is composed of discrete parts.

Where high-speed response is not required, a multiplier or divider of the integral type is available to be used. Moreover, it is easy to make from discrete parts in this method. The principle of a circuit for this case is shown in FIGS. 6(a) and 6(b).

Figure 6A:
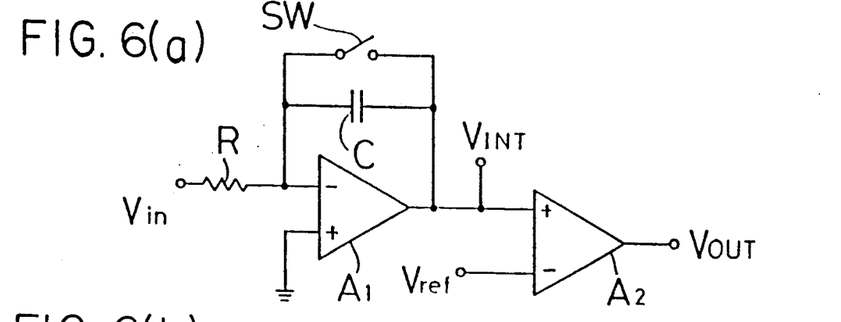
FIGS. 6(a) and (b) are a wiring diagram and a wave form chart showing a principle of a control system where constant electric power is supplied to a thermistor with an analog multiplier for a thermal environment sensor of the self-heating type.
Figure 6B:
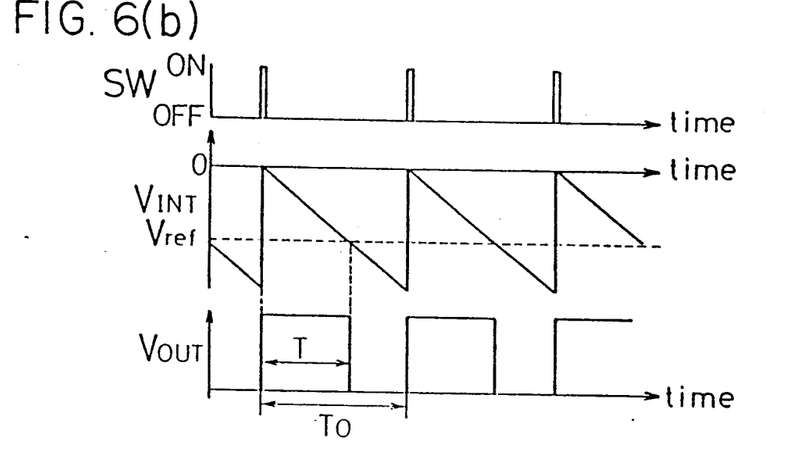

When the condition of a switch SW is changed from ON to OFF in the circuit in FIG. 6(a), an operational amplifier A1 starts integral action, as shown in FIG. 6(b). Time T when the output level of a comparator A2 reaches the high value is expressed in formula (8), wherein the error of the operational amplifier A', switch-on time and so on are ignored for simplification, and an input voltage Vin within the reset time is considered to be constant.

$$T = C \cdot R(Vref/Vin) \quad (8)$$

When each wave form is so shaped as to have a constant value $V_H$ when the output of the comparator A' is at the high level, and to have a ground level (GND level) at the low level and is smoothed by a low-pass filter, the output VO of the low-pass filter is expressed in formula (9) when the repetition period of the switch is TO to obtain an output inversely proportional to the input.

$$\begin{aligned} VO &= V_H(T/TO) \\ &= V_H \cdot C \cdot R \cdot Vref/(Vin \cdot TO) \end{aligned} \quad (9)$$

In a thermistor voltage driving circuit, a constant power can be applied when the thermistor current is input to the above described circuit and the thermistor voltage is changed according to the output voltage. Also, in this case, an output proportional to the thermistor resistance is obtained when the voltage at the high level of the output from the comparator is proportional to the thermistor voltage.

Further, in the current driving circuit, regulation of the voltage and measuring of the thermistor resistance (conductance) can be done at the same time and in the same process as described above.

(3) The constant power driving method in which constant energy is supplied.

This method is essentially disadvantageous in a case where a battery or the like is used as a power source where the voltage is low and is a mono-type, since the circuits including the integrator are constituted as an inversion amplifier.

Therefore, a method of using a circuit not provided with an active integrator must be examined. With reference to the charge and discharge of a condenser C in the circuit shown in FIG. 7(a), the condenser C is charged through a resistance r when a switch S1 is ON and a switch S2 is OFF. On the contrary, when the switch S1 is OFF and the switch S2 is ON, the condenser discharges through the resistance R.

Figure 7A:
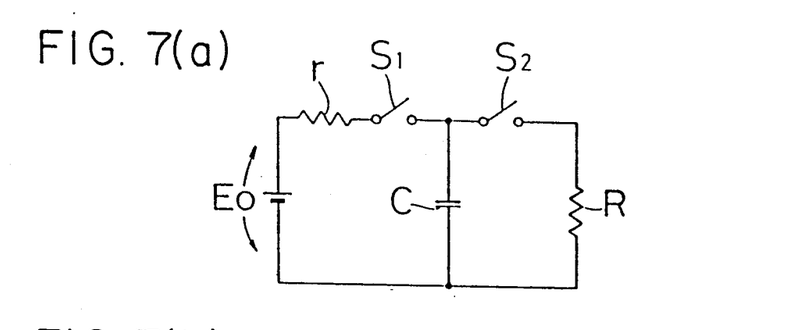
FIGS. 7(a) and (b) are a wiring diagram and a wave form chart showing a principle of a driving system where a constant power supply supplying a constant energy is provided, and with the same analog multiplier.
Figure 7B:
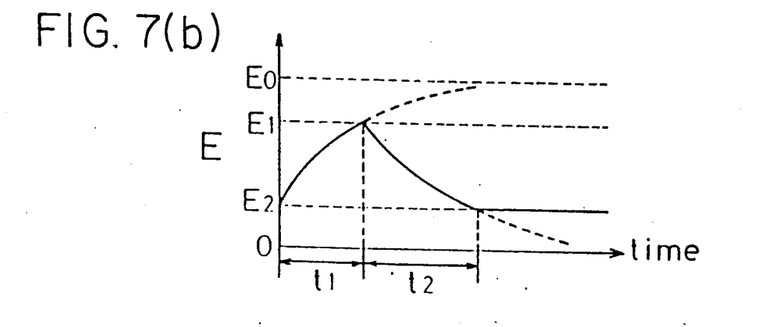

When an end voltage E between the plates of the condenser C at the beginning of charging is $E_2$, the change of voltage E is expressed as shown in FIG. 7(b) when $E = E_2$.

$$E = E_0 - (E_0 - E_2) e^{-t/C \cdot r} \quad (10)$$

A time t1 required for charging until the voltage reaches $E_1$ is:

$$t_1 = C \cdot r \cdot ln\ [(E_0 - E_2)/(E_0 - E_1)] \quad (11)$$

When the switch S1 is turn OFF and the switch S2 is turned ON at the time the voltage E of the condenser becomes $E_1$, a discharging cycle starts thereafter, according to the formula:

$$E = E_1 \cdot e^{-(t - t_1)/C \cdot R} \quad (12)$$

On the other hand, the time $t_2$ required for discharging until the voltage becomes $E_2$ is:

$$t_2 = C \cdot R \cdot ln\ (E_1/E_2) \quad (13)$$

The energy $\epsilon$ the condenser C gives to the resistance R during one cycle of such charge and discharge is:

$$\epsilon = C\ (E_2{}^2 - E_1{}^2)/2 \quad (14)$$

Therefore, when the voltage $E_1 \cdot E_2$ and the capacity of the condenser C are all constant, the energy the resistance R consumes during a charging and discharging cycle is kept constant. When the charging and discharging cycle is repeated at a certain period tO(-tO $\geq t_1 + t_2$), the average consumed power P is given by formula (15), and constant power is available to drive the circuit.

$$P = \epsilon/tO \quad (15)$$

When the resistance R is replaced with a thermistor, constant power driving of the thermistor can be carried out. Also, since the discharging time is proportional to the thermistor resistance according to formula (13), the thermistor resistance can be measured simultaneously with driving by the constant power when the discharging time is measured. In this case, the above described period tO is limited to the range tO $\geq t_1 + t_2$ because the source voltage E0 does not substantially participate in the action under that condition. Moreover, the resistance r for limiting the charging current is preferably provided in order to limit the charging current within an allowable ripple current of of the condenser C and also in order to lessen overshoot of the charged voltage caused by a delay time in a voltage detector, a switching sensor, etc.

Figure 8:
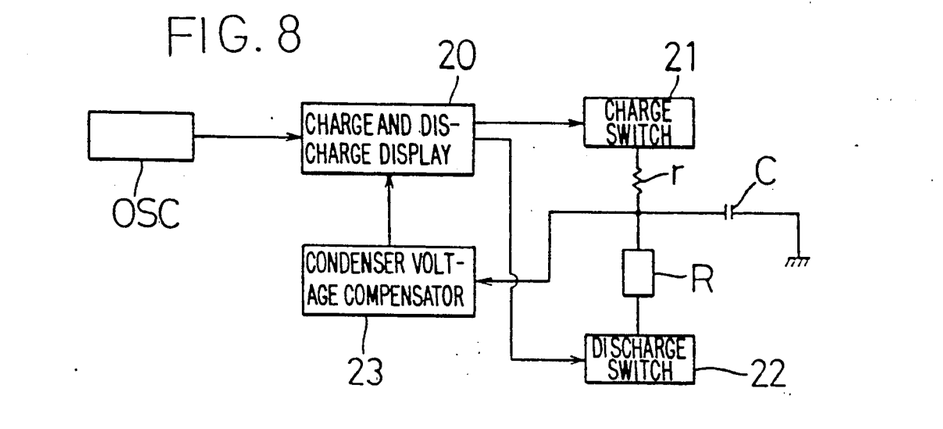
FIG. 8 is a block diagram of a circuit arrangement for the driving system of FIG. 7.
Figure 9:
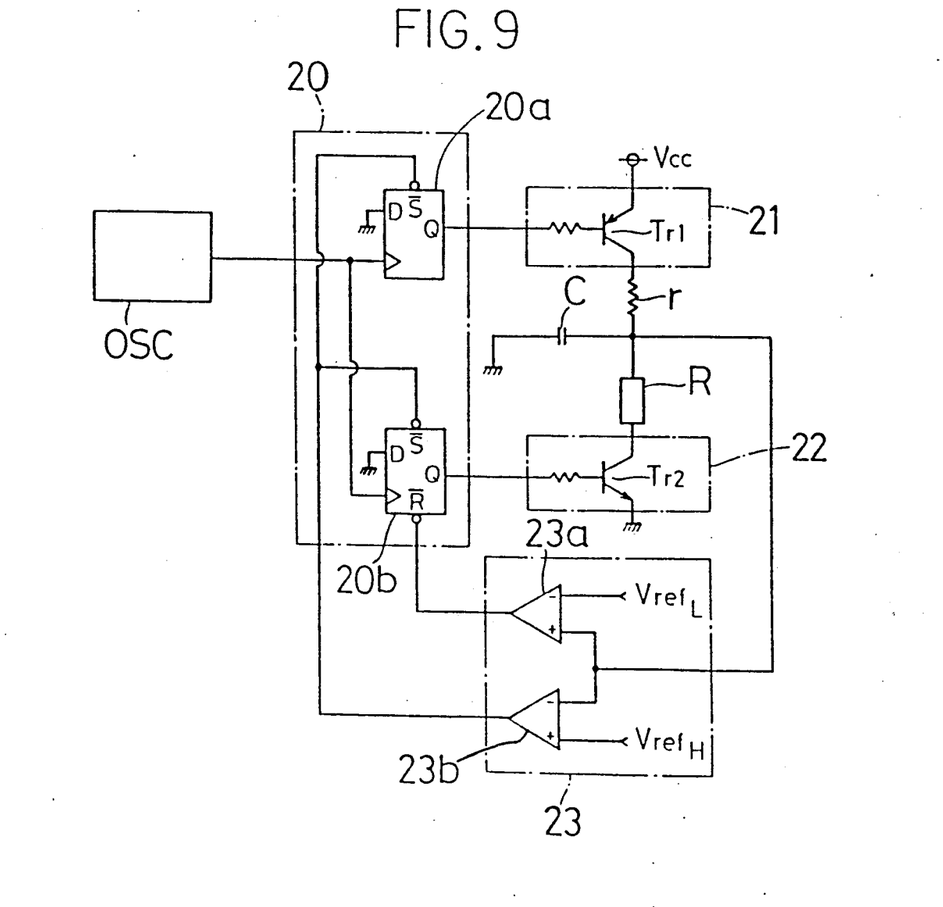
FIG. 9 is a detailed circuit diagram of the circuit arrangement of FIG. 8.

A block diagram of a circuit for such a constant power driving method in which constant energy is supplied and a detailed circuit arrangement are shown in FIG. 8 and FIG. 9, respectively. The circuit is provided with a charge and discharge controlling part 20 which is composed of first and second latches 20a and 20b (flip-flops) and is arranged so as to start the control of the charge and discharge of the condenser by receiving a clock signal from an oscillator OSC. It is further provided with a charge switch 21 composed of a transistor Tr1 which charges the condenser C by receiving an output signal from the first latch 20a of the charge and discharge controlling part 20, a discharge switch 22 composed of a transistor Tr2 which inversely discharges the condenser C by receiving the output signal from the second latch 20b of the charge and discharge controlling part 20, a condenser voltage comparing part 23 composed of the first and second comparators 23a and 23b for comparing reference voltages Vref H and Vref L with the voltage of the condenser C to set or reset the latches 20a and 20b of the charge and discharge controlling part 20, the resistance r for limiting the charging current, and the thermistor R as a load.

The outputs of both latches 20a and 20b are reset at every positive edge of the clock pulses from the oscillator OSC. Receiving these resetting signals, the first transistor Tr1 is turned ON and the second transistor Tr2 is turned OFF to start charging the condenser C. Thereafter, when the voltage of the condenser C reaches above the predetermined reference voltage Vref H, the outputs of both latches 20a and 20b are reset by the output of the second comparator 23b. The second transistor Tr2 is turned ON and the first transistor Tr2 is turned OFF to let the condenser C start discharging. When the condenser C has discharged down to the predetermined voltage Vref L, the output of the second latch 20b is reset by the output of the first comparator 23a to cause the condenser C to interrupt the discharge. Thereafter, this condition is retained until the positive edge of the next clock pulse from the oscillator OSC.

A load resistance value is derived by measuring the discharging time (the ON period of the second transistor Tr2). Also, when an approximately constant power action is not available due to a load fluctuation, power source voltage fluctuation and so on, that situation can be detected by monitoring the ON or OFF conditions of both transistors Tr1 and Tr2 (usually both transistors Tr1 and Tr2 are in the OFF condition) through the positive edge of the clock pulses from the oscillator OSC.

When the highest and lowest limit of the condenser are Vref H, Vref L, respectively and the load resistance value is R, the discharging time $t_{dc}$ is expressed by:

$$t_{dc} = C \cdot R \cdot ln\ (Vref\ H/Vref\ L) \quad (16)$$

When the oscillating period of the oscillator OSC is tO, the average load supply power P is expressed by:

$$P = (\tfrac{1}{2}) \cdot C (V\text{ref } H^2 - V\text{ref } L^2)/tO \quad (17)$$
$$= (\tfrac{1}{2}) \cdot [(V\text{ref } H^2 - V\text{ref } L^2)/(l\, n\, V\text{ref } H - l\, n\, V\text{ref } L) \cdot (1/R) \cdot (t_{dc}/tO)$$

Therefore, average supply power is calculated with a duty rate when it is connected with the load resistance the value of which is known. Also, inversely, the supplying power is preset properly without being affected by the dispersion of the capacity of the condenser based on formula (18) in such a manner that the term tO is preset so as to keep the duty rate constant by connecting to a known resistance.

$$t_{dc}/t = a \cdot R \cdot P \quad (18)$$

Wherein, $$a = 2\,(l\, n\, V\text{ref } H - l\, V\text{ref } L)/(V\text{ref } H^2 - V\text{ref } L^2) \quad (19)$$

Moreover, a secular change which inavoidably occurs in a condenser having a large capacity can be easily revised by periodically carrying out such an operation.

Figure 10:
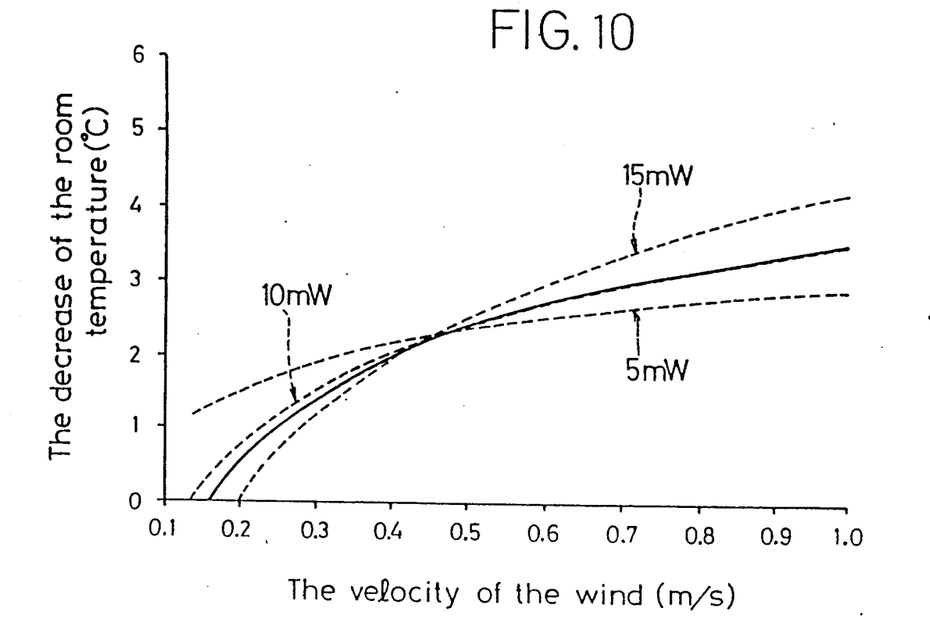
FIG. 10 is a graphical representation showing a variation of the temperature drop according to the wind velocity when the quantity of heat of the temperature detector is changed.

The effects of a concrete embodiment of this invention will now be explained. The course of the decrease in the output temperature of the temperature detector due to the wind velocity is shown by broken lines in FIG. 10 for a case when the temperature detector is a self-heated bead thermistor and the diameter of which is 1.5 mm, wherein the wind velocity dependence of the effective temperature drop (from FIG. 12) is shown as a full line curve. According to this figure, the more the increase of the quantity of self heating of the thermistor from 5 mW toward 15 mW, the more the change of the temperature becomes large, and the curve at 10 mV almost corresponds to the curve of the effective temperature drop.

Figure 11:
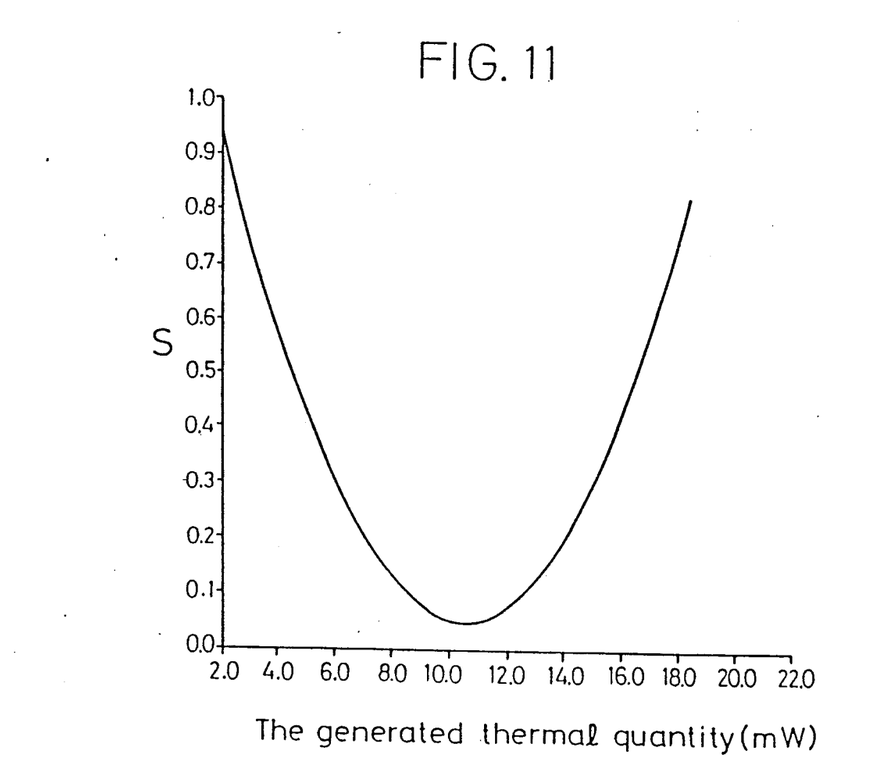
FIG. 11 is a graphical representation of a property in the same way when an optimum quantity of heat of the temperature detector is predetermined.

Then, an optimum heat quantity is evaluated by using a mean square average value S of balance wherein:

$$S = (\text{the average temperature} - \text{the output value of the temperature detector})^2 \quad (20)$$

The relation between this mean square average value S and quantity of heat of the temperature detector is shown in FIG. 11. According to this figure, it is seen that a remarkable optimum value exists for the quantity of heat, which is nearly 10 mV in this example.

INDUSTRIAL APPLICABILITY

According to the thermal environment sensor of this invention, the effective temperature taking into account the air temperature and the wind velocity can be measured with a sensor consisting of a single temperature detector and a simple circuit. It is especially effective for carrying out control of a comfortable air conditioner.

We claim:

1. A thermal environment sensor, comprising:
   a single temperature detector for detecting temperature and producing an output representative of the detected temperature, said temperature detector having, when heated by a predetermined constant power, a convective heat transfer coefficient giving said temperature detector a wind velocity dependent temperature drop characteristic in close conformity with the effective temperature drop felt by a human body due to the wind velocity;
   a heating means for heating said temperature detector;
   an electric power supplying means connected to said heating means for supplying said heating means with a constant electric power corresponding to said predetermined constant power; and
   a temperature estimating circuit connected to said temperature detector for correcting the output of said temperature detector by a predetermined constant temperature difference for thereby obtaining the effective temperature felt by a human body.

2. A thermal environment sensor, comprising:
   a single temperature detector for detecting temperature and producing an output representative of the detected temperature, said temperature detector having, when heated by a predetermined constant power, a convective heat transfer coefficient giving said temperature detector a wind velocity dependent temperature drop characteristic in close conformity with the effective temperature drop felt by a human body due to the wind velocity, said detector being a detector which is self heating when supplied with electric power;
   an electric power supplying means connected to said temperature detector for supplying said temperature detector with a constant electric power corresponding to said predetermined constant power; and
   a temperature estimating circuit connected to said temperature detector for correcting the output of said temperature detector by a predetermined constant temperature difference for thereby obtaining the effective temperature felt by a human body.

3. A thermal environment sensor as claimed in claim 1 or claim 2 in which said temperature estimating circuit comprises means for producing an output signal suitable for control of the operation of an air conditioner.

* * * * *